(12) United States Patent  
Hepkin et al.

(10) Patent No.: US 7,979,668 B2
(45) Date of Patent: *Jul. 12, 2011

(54) METHOD AND SYSTEM FOR AUTOMATICALLY DISTRIBUTING REAL MEMORY BETWEEN VIRTUAL MEMORY PAGE SIZES

(75) Inventors: David A. Hepkin, Austin, TX (US); Thomas S. Mathews, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/347,386

(22) Filed: Dec. 31, 2008

(65) Prior Publication Data

US 2009/0113165 A1  Apr. 30, 2009

Related U.S. Application Data

(63) Continuation of application No. 11/334,664, filed on Jan. 18, 2006, now Pat. No. 7,484,074.

(51) Int. Cl.
G06F 12/00 (2006.01)
G06F 13/00 (2006.01)
G06F 13/28 (2006.01)

(52) U.S. Cl. ................................ 711/203; 711/E12.078
(58) Field of Classification Search .................. 711/203, 711/E12.078
See application file for complete search history.

(56) References Cited

U.S. PATENT DOCUMENTS

| 3,911,401 | A | 10/1975 | Lee |
| 4,422,145 | A | 12/1983 | Sacco et al. |
| 5,247,687 | A | 9/1993 | Eilert et al. |
| 5,414,842 | A | 5/1995 | Archer et al. |
| 5,752,261 | A | 5/1998 | Cochcroft, Jr. |
| 5,802,341 | A | 9/1998 | Kline et al. |
| 6,233,666 | B1 | 5/2001 | Mathews et al. |
| 6,754,788 | B2 | 6/2004 | Mathews et al. |
| 7,484,074 | B2 * | 1/2009 | Hepkin et al. ............... 711/208 |
| 2003/0093644 | A1 | 5/2003 | Fanning |
| 2005/0268052 | A1 | 12/2005 | Hepkin et al. |

OTHER PUBLICATIONS

Hepkin, Pretranslating Input/Output Buffers in Environments With Multiple Page Sizes, U.S. Appl. No. 10/920,907, Aug. 18, 2004.
Kriz, Variable Block Paging for Virtual Memory, Sep. 1984, pp. 2296-2298.
Miller, Memory Proportioned Pages, IBM Technical Disclosure Bulletin, Jul. 1973, pp. 562-563.
Office Action dated Jun. 4, 2008, U.S. Appl. No. 11/334,664.
Office Action dated Dec. 7, 2007, U.S. Appl. No. 11/334,664.

* cited by examiner

Primary Examiner — Sheng-Jen Tsai
(74) Attorney, Agent, or Firm — Dillon & Yudell LLP

(57) ABSTRACT

A method, system and computer program product for allocating real memory to virtual memory page sizes when all real memory is in use is disclosed. In response to a page fault, a page frame for a virtual page is selected. In response to determining that said page does not represent a new page, a page is paged-in into said page frame a repaging rate for a page size of the page is modified in a repaging rates data structure.

10 Claims, 4 Drawing Sheets

METHOD AND SYSTEM FOR AUTOMATICALLY DISTRIBUTING REAL MEMORY BETWEEN VIRTUAL MEMORY PAGE SIZES

PRIORITY CLAIM

The present application is a continuation of U.S. patent application Ser. No. 11/334,664, titled, "Method and System for Automatically Distributing Real Memory Between Virtual Memory Page Sizes," filed on Jan. 18, 2006, the contents of which is incorporated herein by reference in its entirety.

BACKGROUND OF THE INVENTION

1. Technical Field

The present invention relates in general to data processing systems and in particular to memory management within data processing systems. Still more particularly, the present invention relates to a system, method and computer program product for automatically distributing real memory between virtual memory page sizes when all real memory of a system is in use.

2. Description of the Related Art

With the increasing penetration of processor-based systems into every facet of human activity, demands have increased on the processor and application-specific integrated circuit (ASIC) development and production community to produce systems that are able to store and process ever-increasing amounts of data at ever-higher speeds. Circuit products, including microprocessors, digital signal and other special-purpose processors, and ASICs, have become involved in the performance of a vast array of critical functions, and the involvement of microprocessors in the important tasks of daily life has heightened the expectation of instantaneous results. Whether the impact of delay in calculations would be measured in human lives or in mere dollars and cents, consumers of circuit products have lost tolerance for results that do not appear instantaneously.

The increasing emphasis on speed of the result has resulted in a concurrent emphasis on computing device performance. While users tend to think of performance in terms of processor speed, installed physical memory and graphics cards, other factors, such as such as the effectiveness of resource allocation in the use of virtual memory, can also prove critical. Virtual memory refers to the manipulation of a data structure called a paging file. The paging file is very closely related to the physical RAM installed in the computer. Its purpose is to complement the physical RAM and make increased storage available to the system. Both services and installed applications can benefit from this 'extra' RAM, even though it is substantially different from the physical RAM that tends to dominate discussions of storage.

When the load imposed by applications and services running on a computer nears the amount of installed RAM, an operating system needs additional RAM. When no additional RAM is available, the data processing system employs a substitute, such as virtual memory. The page file is created during operating system installation and resides on a hard drive. Page files are measured in megabytes. The size of the page file is based on the amount of RAM that is installed in the computer. In general, a page frame refers to a fixed piece of real memory (e.g. RAM) that serves as a container for a virtual page. A virtual page is a fixed-size unit of data that can exist either in memory (inside of a page frame) or on disk in paging space. A virtual page can be paged out (moved out of a page frame into paging space on disk) or paged in (moved into a page frame from paging space on disk). By default, some operating systems create a page file which is 1.5 times larger than the amount of installed physical RAM.

To improve system performance, many computer architectures and operating systems implement paging files with multiple page sizes. One significant problem with the use of multiple page sizes lies in determining how to allocate memory to each page size. For example, on a system with two page sizes of 4 k and 64 k, a decision must be made as to the allocation between 4 k and 64 k pages. The robustness and flexibility of systems currently in use are undermined by the inability under the prior art to dynamically adjust the allocation of virtual memory between various page sizes when all real memory is in use.

In situations in which all of the real memory of a system is not in use (i.e., the virtual memory footprint of a system's workload is smaller than the real memory size of the data processing system), the problem of memory allocation is simplified, because an operating system can automatically adjust the amount of memory to use for each page size based on the amount of memory that is "free" in each page size. For example, in a system with 64 k and 4 k pages, if 50% of the 64 k pages on the system are not in use and 3% of the of the 4 k pages are not in use, an operating system can be programmed under the prior art to shift memory from 64 k pages to 4 k pages. A page frame is a block of physical storage or RAM allocated to support a page.

The significant and, under the prior art, inadequately answered challenge for automatically distributing real memory across page sizes arises when all real is in use (i.e., the virtual memory footprint of a system's workload is larger than the real memory size of the data processing system). In such a case, an operating system cannot use the amount of free memory of each page size as the basis of a heuristic for allocating memory, because all of the available memory is in use.

For example, in a system with 64 k and 4 k pages, there could be two jobs using 4 k pages and two jobs using 64 k pages. The two 4 k jobs could have consumed all of the available 4 k pages on the system by scanning through cached file data that is used only once. The two 64 k jobs may have used all available 64 k pages with data that is highly referenced by the 64 k jobs, and due to the thrashing on the 64 k pages, these jobs may run slowly. In such an environment, the total throughput on the system suffers, and the total throughput would increase if an operating system increased the number of 64 k pages on the system to reduce thrashing of 64 k pages by 64 k jobs. Because the 4 k jobs do not re-reference cached file data, they don't need to keep the cache file data in memory, and reducing the number of 4 k pages would have no negative effect on system performance.

The challenge to an operating system, which is not solved by the prior art, is detecting a situation such as that described immediately above, and adjusting the amount of memory allocated to different page sizes to improve a system's overall performance. What is needed is a system, method and computer program product for automatically distributing real memory between virtual memory page sizes when all real memory of a system is in use.

SUMMARY OF THE INVENTION

A method, system and computer program product for allocating real memory to virtual memory page sizes when all real memory is in use is disclosed. In response to a page fault, a page frame for a virtual page is selected. In response to determining that said page does not represent a new page, a page is paged-in into said page frame a repaging rate for a page size of the page is modified in a repaging rates data structure.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for automatically distributing real memory between virtual memory page sizes when all real memory is in use. In the present invention, when a workload's virtual memory footprint exceeds a system's real memory size, an operating system will begin page replacement to write out in-memory pages to disk, so that the in-memory pages can be used for other data. Writing out in-memory pages is acceptable as long as the data that is written out to the disk is not immediately needed. However, if the data that is written out to the disk is needed again in a short period of time, the data must be brought back in from disk (referred to as a "re-page"), and the system will experience throughput problems, because the user of the data must wait for the data to be returned to memory. Thus, reducing the number of pages that are re-paged on a system improves the effectiveness of virtual memory usage because it increases the amount of highly-referenced data that remains in memory. The present invention contains a method for measuring the rate at which pages are re-paged to determine how to distribute memory across page sizes.

Figure 1:
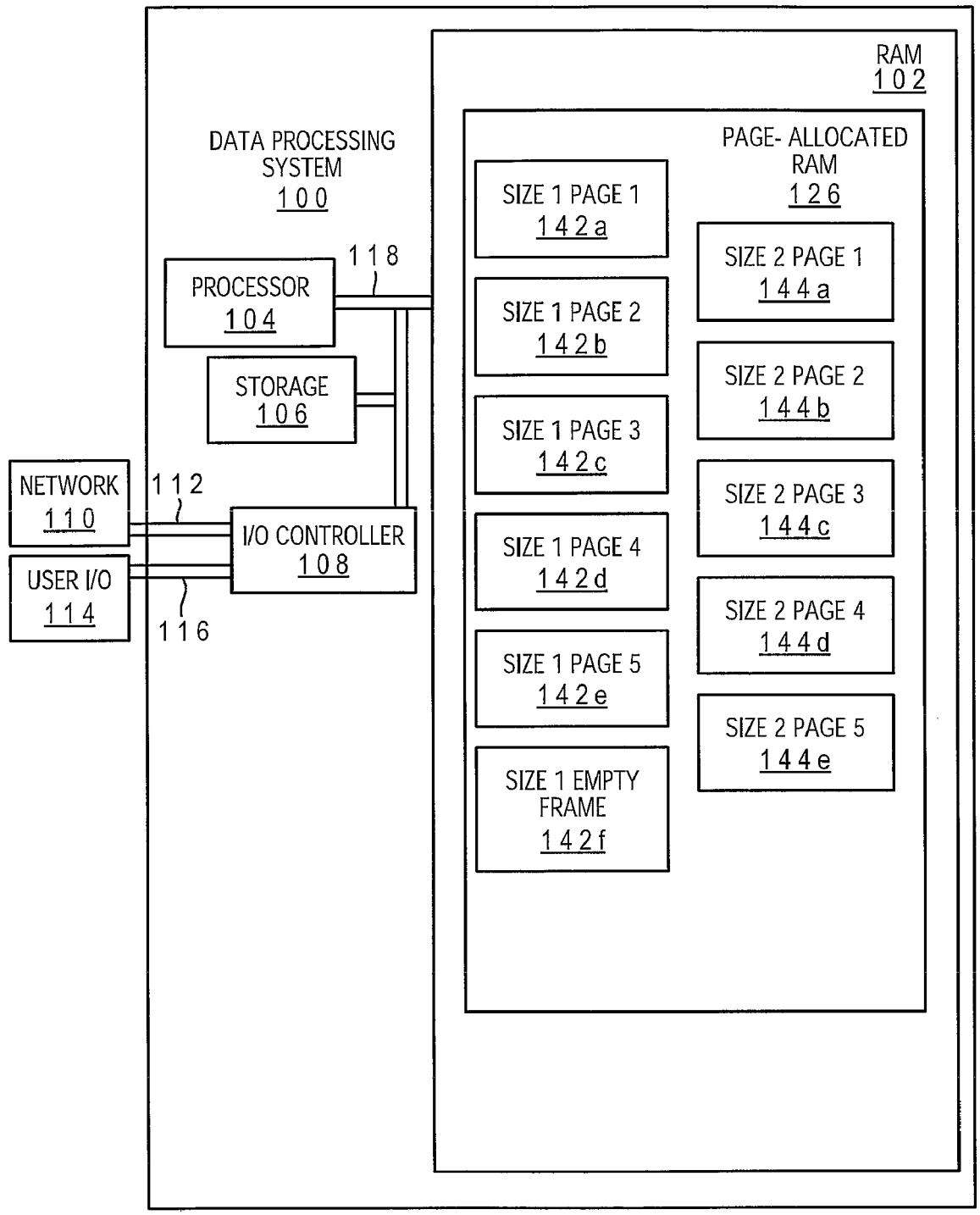
FIG. 1 depicts a block diagram of a general-purpose data processing system for use in the present invention of a method, system and computer program product for automatically distributing real memory between virtual memory page sizes when all real memory of a system is in use.

With reference now to the figures, and in particular with reference to FIG. 1, a block diagram of a general-purpose data processing system, in accordance with a preferred embodiment of the present invention, is depicted. Data processing system 100 contains a processing storage unit (e.g., RAM 102) and a processor 104. Data processing system 100 also includes non-volatile storage 106 such as a hard disk drive or other direct-access storage device. An Input/Output (I/O) controller 108 provides connectivity to a network 110 through a wired or wireless link, such as a network cable 112. I/O controller 108 also connects to user I/O devices 114 such as a keyboard, a display device, a mouse, or a printer through wired or wireless link 116, such as cables or a radio-frequency connection. System interconnect 118 connects processor 104, RAM 102, storage 106, and I/O controller 108. Within RAM 102, a system of page-allocated RAM 126 contains five pages of a first size 142a-142e and five pages of a second size 144a-144e. An empty frame of a first size 142f is available for allocation of a page.

Figure 2:
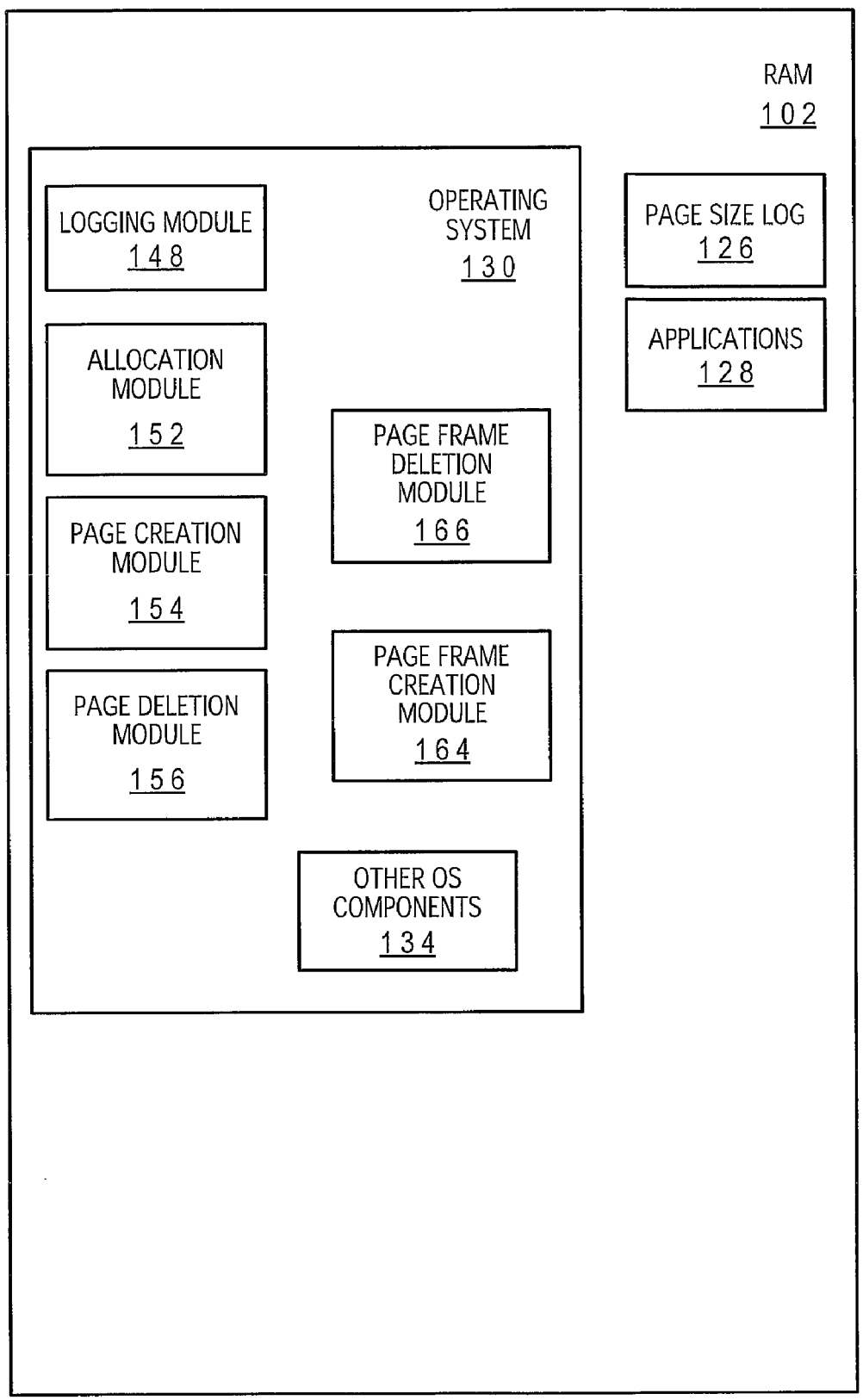
FIG. 2 depicts a block diagram of a data structures in the RAM of a data processing system for use with the present invention of a method, system and computer program product for automatically distributing real memory between virtual memory page sizes when all real memory of a system is in use.

Turning now to FIG. 2, a block diagram of a data structures in the RAM of a data processing system for use with the present invention of a method, system and computer program product for automatically distributing real memory between virtual memory page sizes when all real memory of a system is in use is depicted. Within RAM 102, data processing system 100 stores several items of data and instructions while operating in accordance with a preferred embodiment of the present invention. An operating system 130 controls the interaction of applications 128 with processor 104, RAM 102, storage 106, and I/O controller 108. Within operating system 130, a logging module 148 prepares a page size log 126, which is a repaging rates data structure detailing statistics for page requests for use by allocation module 152 in assigning page frame sizes. A page creation module 154 creates new pages and a page deletion module 156 deletes pages that are no longer needed. Likewise, a page frame creation module 164 creates new page frames and a page frame deletion module 166 deletes page frames that are no longer needed. Other OS components 134 perform other standard functions of an operating system.

Figure 3A:
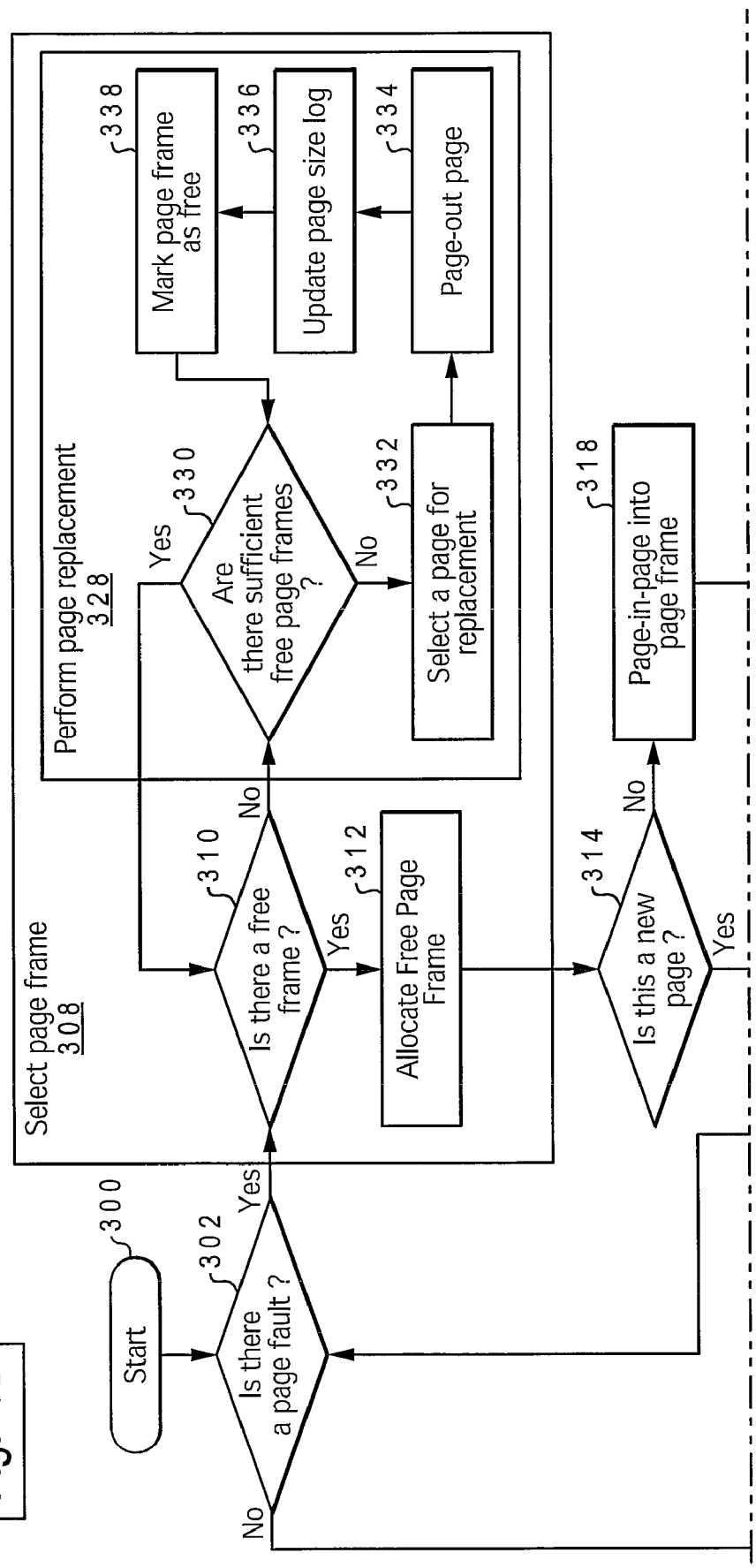
FIG. 3 is a high-level logical flowchart of a process for automatically distributing real memory between virtual memory page sizes when all real memory of a system is in use.
Figure 3B:
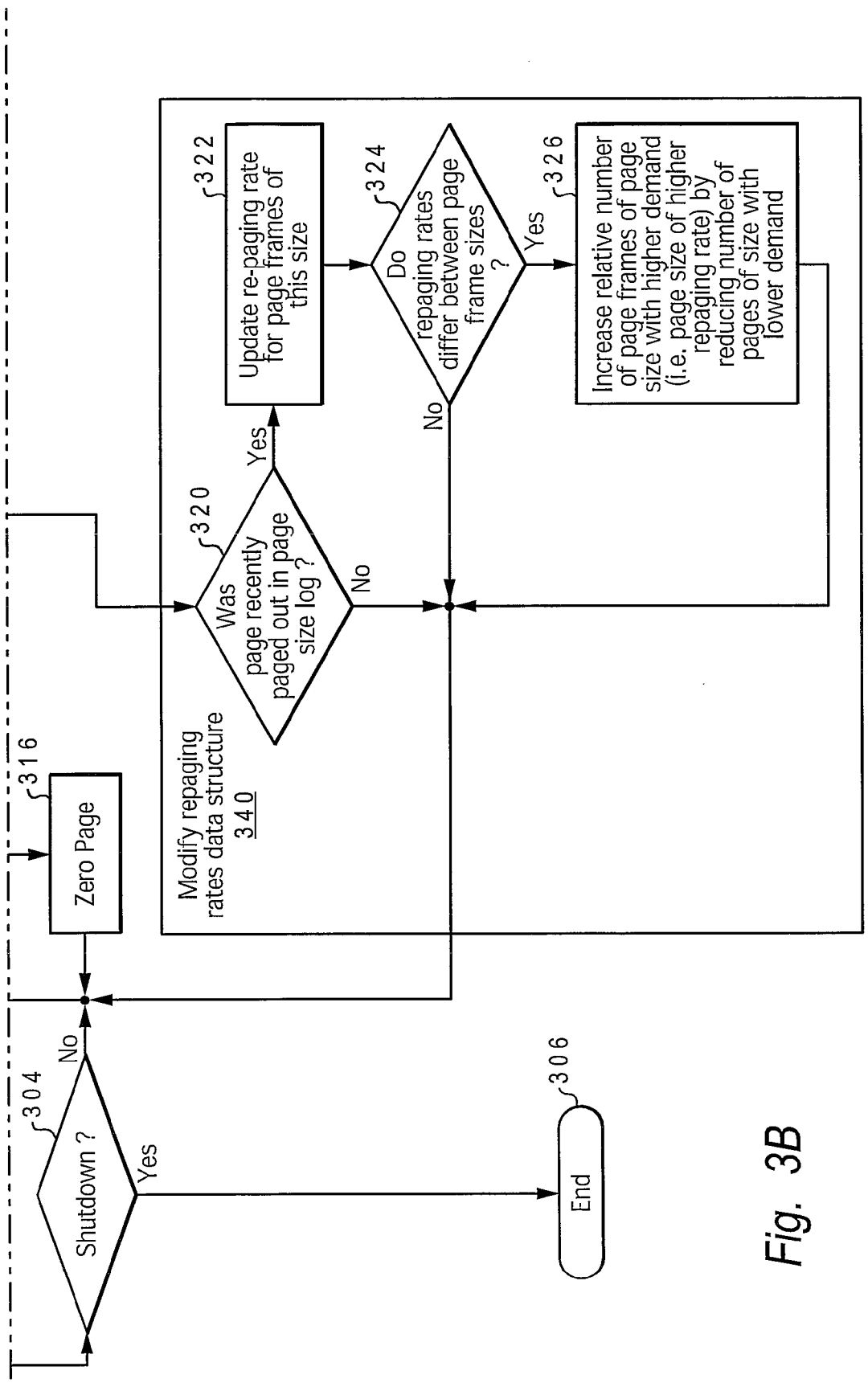

Referring now to FIG. 3, a high-level logical flowchart of a process for automatically distributing real memory between virtual memory page sizes when all real memory of a system is in use is illustrated. The process starts at step 300 and then moves to step 302, which depicts allocation module 152 determining whether a page fault exists. If allocation module 152 determines that no page fault exists, then the process proceeds to step 304. At step 304, operating system 130 determines whether an instruction to shut down has been received. If operating system 130 determines that an instruction to shut down has been received, then the process ends at step 306. If operating system 130 determines that no instruction to shut down has been received, then the process returns to step 302.

Returning to step 302, if allocation module 152 determines that a page fault exists, then the process proceeds to step 308, which is a macro-step depicting allocation module 152 selecting a page frame. Macro step 308 starts at step 310, which illustrates allocation module 152 determining whether a free page frame exists in page-allocated RAM 126. If allocation module 152 determines that a free page frame exists, then the process moves to step 312. Step 312 depicts allocation module 152 allocating a page frame in page-allocated RAM 126. The process then exits macro-step 308 as it moves to step 314, which illustrates page creation module 154 determining whether the page frame allocated in step 312 is a page frame for a new page. If page creation module 154 determines that the page frame allocated in step 312 is a page frame for a new page, then the process moves to step 316, which depicts page creation module 154 zeroing the page allocated in step 312. The process then returns to step 302.

Returning to step 314, if page creation module 154 determines that the page frame allocated in step 312 is not a page frame for a new page, then the process moves to step 318, which illustrates page creation module 154 paging-in the page allocated in step 312 to an appropriate page frame, such as the page frame allocated in step 312. The process then proceeds to step 320, which is the first step of macro-step 340. Macro-step 340 contains steps 320-326, which illustrate logging module 148 modifying a repaging rates data structure, in the form of page size log 126. Macro-step 340 starts at step 320. Step 320 depicts logging module 148 determining whether the page paged-in in step 318 was recently paged out in page size log 126. If logging module 148 determines that the page paged-in in step 318 was not recently paged out in page size log 126, then the process exits macro-step 340 and returns to step 302, which is described above. If logging module 148 determines that the page paged-in in step 318 was recently paged out in page size log 126, then the process moves to step 322, which illustrates logging module 148 updating a repaging rate in page size log 126 for pages of the size of the page paged-in in step 318.

The process next proceeds to step 324, which illustrates logging module 148 determining from page size log 126 whether repaging rates differ between pages of different sizes. If logging module 148 determines from page size log 126 that repaging rates do not differ between pages of different sizes, then the process exits macro-step 340 and returns to step 302, which is described above. If logging module 148 determines from page size log 126 that repaging rates differ between pages of different sizes, then the process proceeds to step 326, which illustrates operating system 130 using page frame deletion module 166 to reduce the number of page frames of a size with lower demand and using page frame creation module 164 to increase the number of page frames of a page size with higher demand (i.e., page size of higher repaging rate). Please note that, in alternative embodiments of the present invention this step could be implemented in many different ways. In an alternative embodiment, instead of page frame deletion and page frame creation modules, a page frame conversion module could be used that converts a group of page frames from one page size to another (i.e. converts 16 4 k page frames into 1 64 k page frame). The process then exits macro-step 340 and returns to step 302, which is described above.

Returning to step 310 in macro-step 308, if allocation module 152 determines that no free page-frame exists, then the process moves to step 330, which is the first step of macro-step 328. Macro step 328 depicts allocation module 152 performing a page replacement. Step 330 illustrates allocation module 152 determining whether sufficient free page frames exist in page-allocated RAM 126. If allocation module 152 determines that sufficient free page frames exist in page-allocated RAM 126, then the process exits macro-step 328 and returns to step 310. If allocation module 152 determines that sufficient free page frames do not exist in page-allocated RAM 126, then the process proceeds to step 332, which illustrates allocation module 152 selecting a page from among page-allocated RAM 126 for replacement. The process next moves to step 334. Step 334 depicts page deletion module 156 paging-out a page from among page-allocated RAM 126. The process then proceeds to step 336, which depicts logging module 148 updating page size log 126. The process next moves to step 338. Step 338 illustrates logging module 148 marking a page frame as free in page size log 126. The process then returns to step 330, which is described above.

As an example, consider a data processing system 100 in which two sizes of page are supported. Assume that a system of page-allocated RAM 126 contains five page frames of a first size 142a-142e of 64 k and five page frames of a second size 144a-144e of 4 k. If all of the memory being used for both page sizes is low or totally exhausted, page replacement by operating system 130 is used and replacement of frames of both pages of a first size 142a-142e and pages of a second size 144a-144e will be undertaken. If a higher percentage of pages of a first size 142a-142e of 64 k than pages of a second size 144a-144e of 4 k is being repaged (selected for replacement, written out to storage 106, and then quickly brought back in from storage 106), then the performance of data processing system 100 will be improved if more memory is used for pages of a first size 142a-142e of 64 k than pages of a second size 144a-144e of 4 k (i.e. by reducing the number of page frames of a second size of 4 k and increasing the number of page frames of a first size of 64 k). The present invention allows, in this example, for more memory to be used for pages of a first size 142a-142e of 64 k than pages of a second size 144a-144e of 4 k. Because the present invention allows for more memory to be used for pages of a first size 142a-142e of 64 k than pages of a second size 144a-144e of 4 k, the pages of a first size 142a-142e of 64 k remain in RAM 102, and the amount of memory that is re-paged is reduced. Thus, applications that reference the pages of a first size 142a-142e of 64 k do not take page faults on highly-referenced the pages of a first size 142a-142e of 64 k and do not have to wait for the pages of a first size 142a-142e of 64 k to be read in from storage 106.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A system for allocating real memory to virtual memory page sizes when all real memory is in use, said system comprising:
   a processor;
   a processing storage unit coupled to the processor; and
   an operating system (OS) executing on the processor and which controls functions occurring on the system, wherein the OS has a plurality of modules that execute within the system to provide the following functions:
   in response to a page fault, selecting a first page frame for a virtual page;
   in response to determining that said virtual page does not represent a new page,
      paging-in a first page into said first page frame; and
      modifying a first repaging rate for a first page size of the first page in a repaging rates data structure;
   determining whether said first repaging rate for said first page size in said repaging rates data structure is different than a second repaging rate for a second page size in said repaging rates data structure;
   decreasing allocated first page frames for said first page size and increasing allocated second page frames for said second page size when said first repaging rate is lower that said second repaging rate;
   increasing said allocated first page frames for said first page size and decreasing said allocated second page frames for said second page size when said first repaging rate is higher than said second repaging rate, wherein said first page size is different from said second page size; and in response to determining that said first page represents a new page, zeroing said first page frame.

2. The system of claim 1, wherein said modifying further comprises:
in response to determining by reference to said repaging rates data structure that said first page was paged out within a predetermined time period, updating said first repaging rate.

3. The system of claim 1, wherein said selecting further comprises, means for, in response to determining that a free page frame exists, allocating said free page frame.

4. The system of claim 1, wherein the functions provided by the plurality of modules further provides the function of: in response to determining that a free page frame does not exist, performing page replacement.

5. The system of claim 4, wherein said performing page replacement further comprises:
in response to determining that a sufficient number of free page frames does not exist,
selecting a page for replacement;
paging out said page for replacement;
updating said repaging rates data structure; and
indicating a new free page frame.

6. A machine-recordable storage medium having a plurality of instructions processable by a machine embodied therein, wherein said plurality of instructions, when processed by said machine, causes said machine to perform a method for allocating real memory to virtual memory page sizes when all real memory is in use, said method comprising:
in response to a page fault, selecting a first page frame for a virtual page;
in response to determining that said virtual page does not represent a new page,
paging-in a first page into said first page frame; and
modifying a first repaging rate for a first page size of the first page in a repaging rates data structure;
determining whether said first repaging rate for said first page size in said repaging rates data structure is different than a second repaging rate for a second page size in said repaging rates data structure;
decreasing allocated first page frames for said first page size and increasing allocated second page frames for said second page size when said first repaging rate is lower that said second repaging rate;
increasing said allocated first page frames for said first page size and decreasing said allocated second page frames for said second page size when said first repaging rate is higher than said second repaging rate, wherein said first page size is different from said second page size; and
in response to determining that said first page represents a new page, zeroing said first page frame.

7. The machine-recordable storage medium of claim 6, wherein said step of modifying further comprises:
in response to determining by reference to said repaging rates data structure that said first page was paged out within a predetermined time period, updating said first repaging rate.

8. The machine-recordable storage medium of claim 6, wherein said step of selecting further comprises, in response to determining that a free page frame exists, allocating said free page frame.

9. The machine-recordable storage medium of claim 6, further comprising, in response to determining that a free page frame does not exist, performing page replacement.

10. The system of claim 1, wherein the plurality of modules comprises one or more of a loggin module, a page creation module, a page deletion module, a page frame creation module, a page frame deletion module, and an allocation module.

* * * * *